Sept. 11, 1928.  G. E. HALLENBECK  1,683,667
MULTIPLE TOOL DRILL
Filed June 9, 1921  3 Sheets-Sheet 1
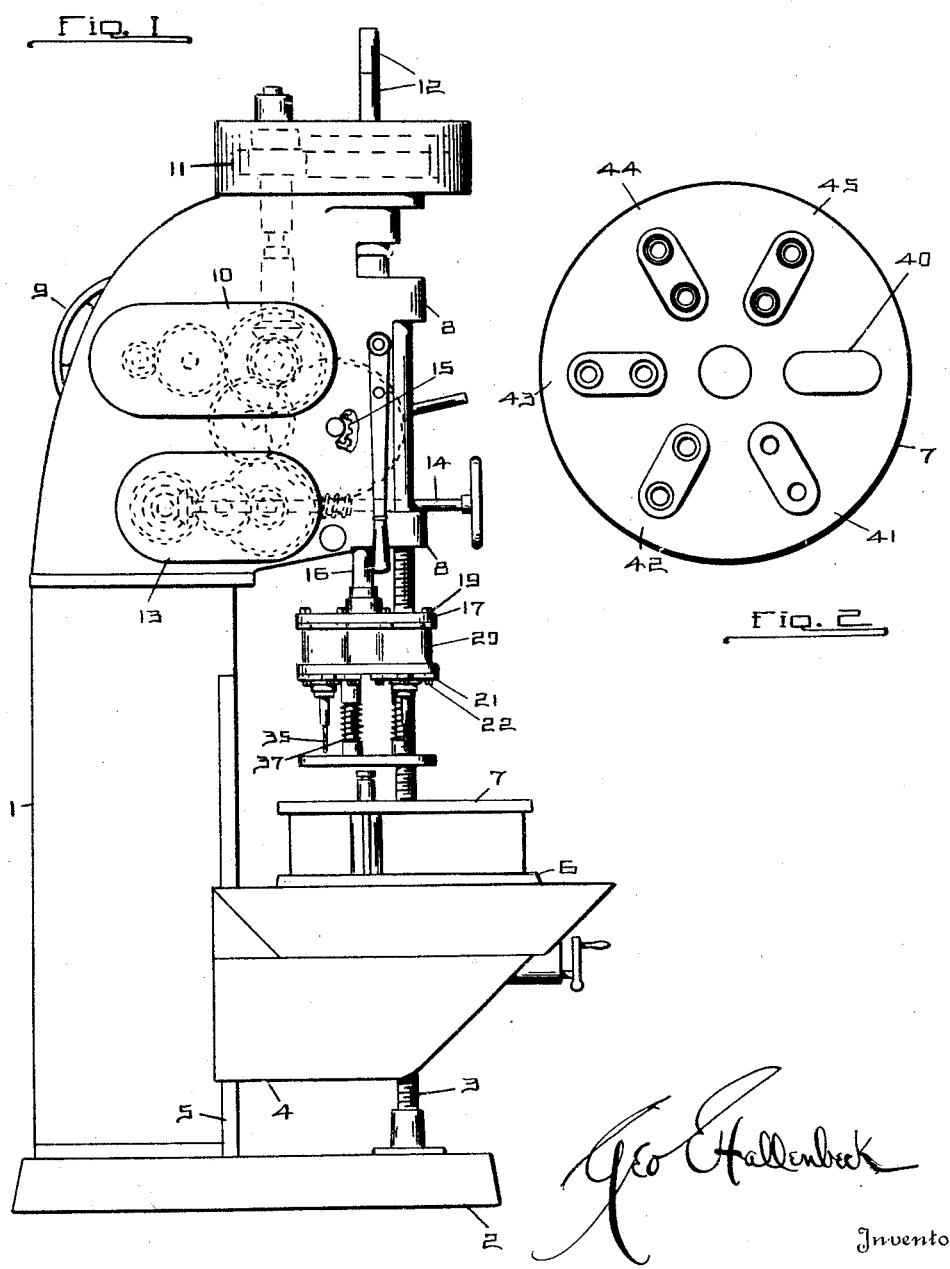

Sept. 11, 1928.  G. E. HALLENBECK  1,683,667
MULTIPLE TOOL DRILL
Filed June 9, 1921   3 Sheets-Sheet 2

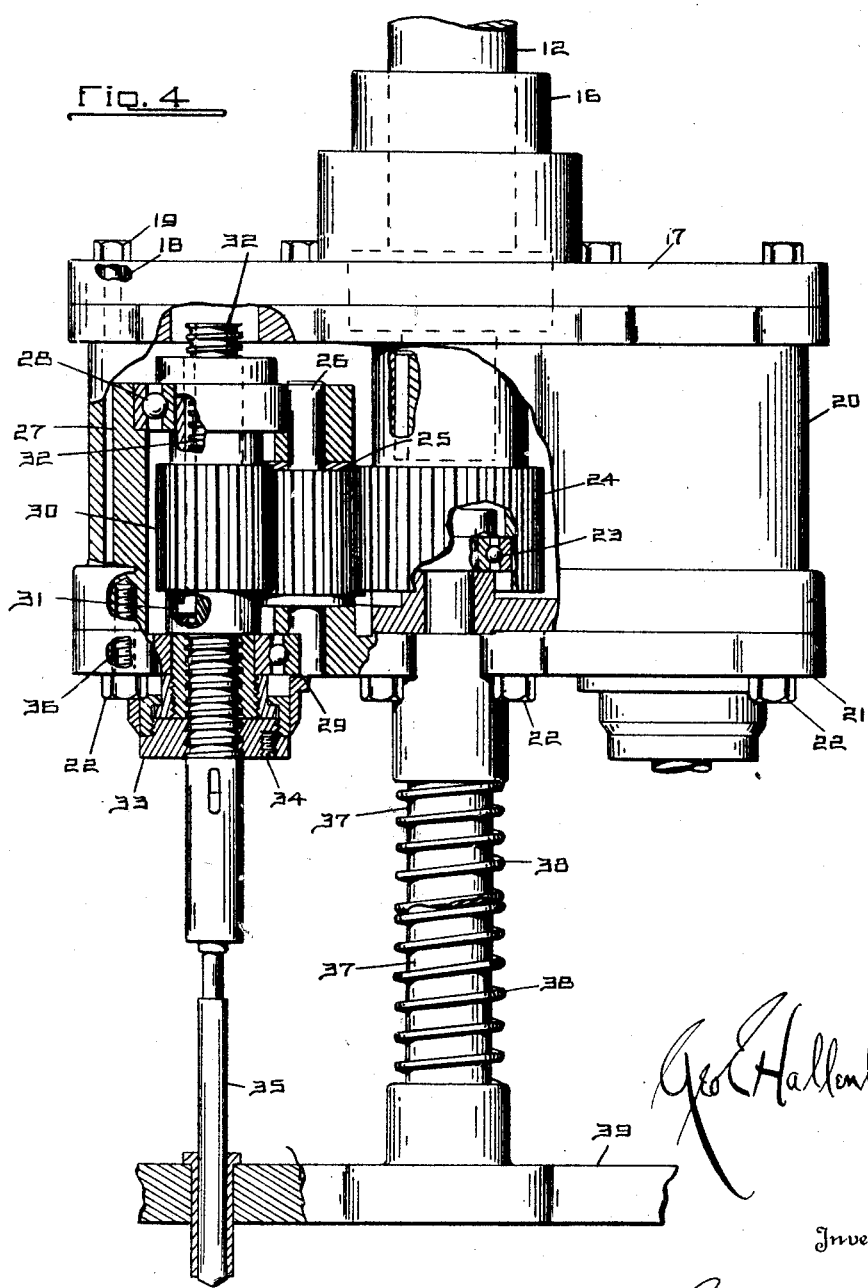

Patented Sept. 11, 1928.

1,683,667

UNITED STATES PATENT OFFICE.

GEORGE E. HALLENBECK, OF TOLEDO, OHIO, ASSIGNOR, BY MESNE ASSIGNMENTS, TO BAKER BROTHERS, INC., OF TOLEDO, OHIO, A CORPORATION OF OHIO.

MULTIPLE-TOOL DRILL.

Application filed June 9, 1921. Serial No. 476,142.

This invention relates to features of multiple tool drill presses.

This invention has utility in the mounting, driving and adjustment of tools to work.

Referring to the drawings:—

Fig. 1 is a side elevation of an embodiment of the invention in a drill press;

Fig. 2 is a plan view of the table fixture of the drill press of Fig. 1;

Fig. 4 is a side elevation with parts broken away of one of the multiple tool carrying heads.

Figure 3:
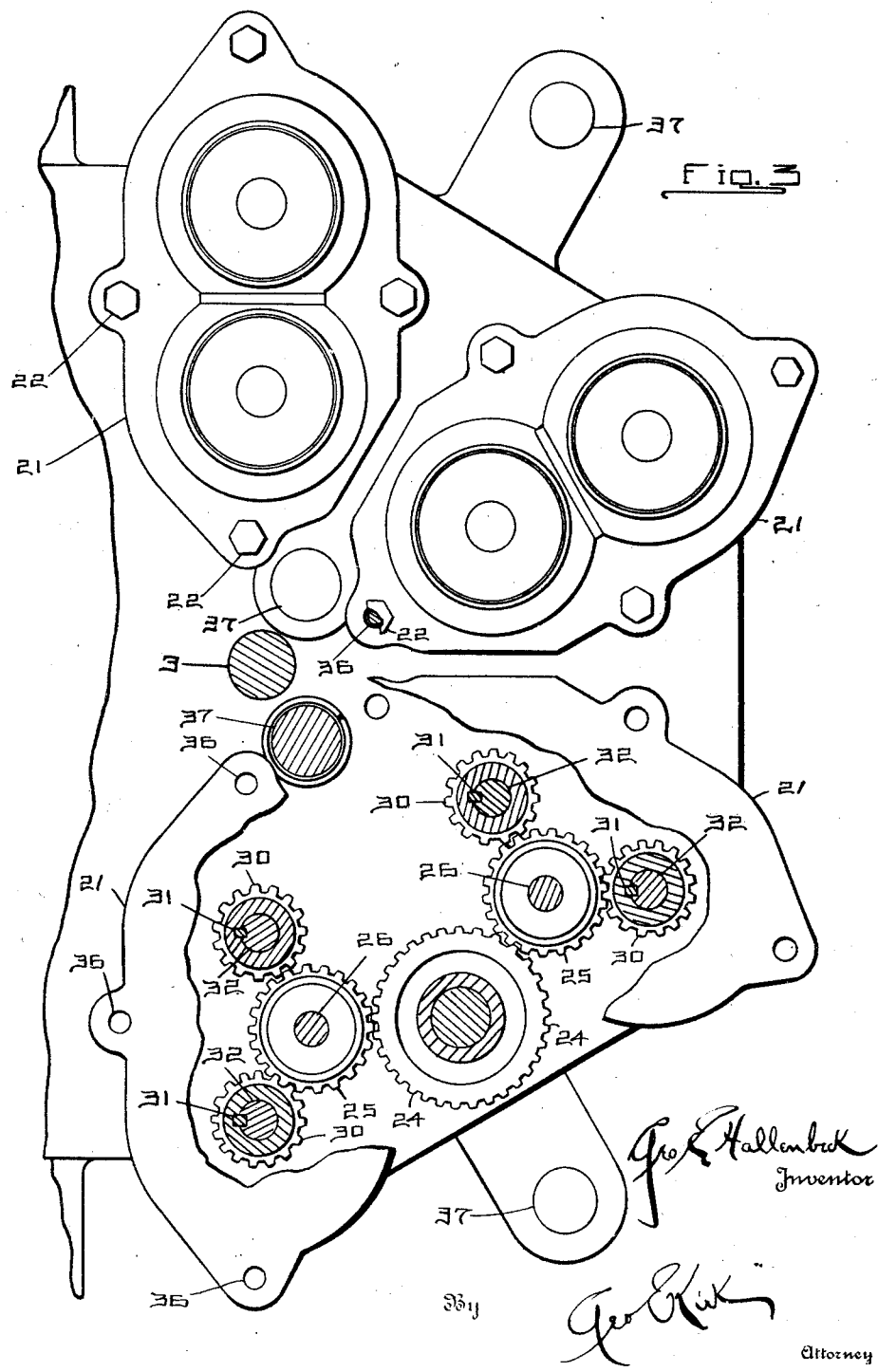
Fig. 3 is a view looking up from the table fixture toward the tool carrying heads, parts being broken away.

Machine tool main frame 1 is shown provided with base 2. Upstanding from this base 2 is threaded stem 3 extending through knee 4 adjustable on guides 5 on the main frame 1. This knee 4 carries angularly shiftable table 6 concentric with the stem 3. Mounted on this table 6 is fixture 7 for anchoring work in various symmetrical radial positions to bring into proper stations under various tools, this fixture 7 being a work holder. The stem 3 is held at its upper portion by guides 8 from the main frame 1, to thus be effective for making more rigid or stable the assembly relation between the overhang and base to minimize any vibration which might be transmitted to the spindles.

Driving pulley 9, through gearing 10, 11, serves to rotate a pair of vertical main drill spindles 12. Driven from the gearing 10 is gear train 13 for rotating shaft 14 connected to drive feed racks 15 on sleeves 16.

Each sleeve 16 at its lower portion terminates in an annular flange 17 having recesses 18 parallel to the spindle 12 for bolts 19. Bolts 19, through these recesses 18 serve to mount the main housing member 20 in position to the flange 17. A supplementary housing member 21 is anchored to this housing member 20 by means of bolts 22. The main housing member 20 has centrally an anti-friction bearing 23 mounting pinion 24 driven from and coaxial with its main spindle 12. This pinion 24 is in mesh with intermediate pinion 25 loosely mounted on stem 26 carried by the housing member 21 in a vertical position parallel to the spindle 12. This housing member 21 also carries upstanding sleeve 27 for roller bearings 28, 29. These bearings 28, 29, provide an anti-friction mounting for sleeve extensions of pinion 30. The pinion 30 is in mesh with the intermediate pinion 25. This sleeve of the pinion 30 is smooth on its inner portion except to provide a way for key 31. This key 31 effects anchoring of this pinion 30 for rotation with tool carrying spindle 32. This spindle 32 is externally threaded. The lower portion of this spindle 32 is engaged by a nut 33. The adjustment of the nut 33 to the housing 21 may be locked by set screw 34. In this grouping of the head, the number of the pinions 25 in mesh with the pinion 24 is shown as two, and the number of pinions in mesh with each pinion 25 is shown as two, thereby providing four tool carrying spindles 32 to be driven from this single main drill spindle 12.

However, in this machine as herein disclosed, there are two parallel main drill spindles 12 driven from the gearing 11 and the installation as herein disclosed may care for eight tools, although the principle herein disclosed is susceptible of variation as may be found desirable for handling the particular work. The anchoring by the bolts 19 precludes any shifting of the main housing 20 to the head carrying flange 17. Fine adjustments between the gears are very accurately taken up by shifting the housing member 21 as to the housing members 17, 20, on account of the play or looseness of openings 36 for bolts 22. This shifting of the housing member 21 to the housing member 20 may be radial or angular. Such slight shifting may adjust the mesh relation between the gears or pinions 25 and 24. The end to be served by such shifting may be the bringing into the desired radial relation the tools 35, so that they may have registry in proper position for the work at succeeding stations. This lateral adjustment to align the tool is simple for light duty high speed work, and may even be used without detrimental effects in heavy duty operations. The vertical positions of the tools 35 may be readily fixed independently to each tool by means of the adjusting nut 33. This means not only a radial or lateral adjustment of the tools to the work, but independent axial adjustment of the tools for taking care of wear or any other conditions which may arise in practice.

Supplementary stems 37 are carried by the housing member 20. About these stems 37 may be disposed helical springs 38 normally thrusting downward a guide bushing 39 for the tools 35 thereby serving as a guide for the tools as well as a supplementary means for holding the work and freeing the tools from the work as the spindles 12 are operated upward in lifting the heads 17, 20, 21.

As an instance of operation hereunder, reference may be had to Fig. 2 upon which a blank piece of work 40 is placed, say at the loading station and this fixture 7 shifted 60° for a first drilling operation at station 41. The table may then be shifted a second 60° to station 42 where a second drilling operation may occur, while the first drilling operation is occurring on a second piece of work at station 41. In this way the tools may be kept working right through and for the shifting to station 43, there may be a reaming and to station 44 a counter-boring, while at station 45 the work may be removed. The radial positioning of the tools for consecutive operations involves matters of accurate registry under small range of adjustment which is herein made conveniently possible in this double spindle machine tool.

What is claimed and it is desired to secure by Letters Patent is:

1. A multiple tool head comprising a driving spindle, gearing actuable from the spindle, a pair of tool holders axially aligned with said gearing, mounting means for tool carrying gearing, said means assembling said pair of holders as a unit for maintaining at all times the constant spacing therebetween, and a support for said mounting means on which the mounting means is shiftable for adjusting the pair of holders as a unit laterally of and relatively to the spindle while maintaining transmission connection from the spindle through the gearing to said holders.

2. A multiple tool head comprising a driving spindle, a gear on the spindle, driven spindles, transmission gearing between said driving spindle gear and said driven spindles, and means mounting the transmission gearing therefrom in said head to a plurality of said driven spindles as a unit independently of said driving spindle gear, and a support for said mounting means to which the mounting means is shiftable for radially adjusting said mounting relatively to said gear on the spindle for thereby varying the mesh extent of the transmission gearing with said driving gear.

3. A multiple head, a main driving spindle, tool carrying rotary holders in said head, holder mounting means embodying a supporting member, and a supported member relatively shiftable for axially adjusting the holders as to the head, and driving connections from the spindle for the holders axially coincident in part mounted by the spindle and the balance axially parallel with the holders and said spindle carried by the supported member, whereby adjustment of the supported member to the supporting member is effective for simultaneously radially adjusting the latter holders relatively to the spindle while maintaining said latter holders in fixed spaced relation with each other.

4. A rotary main spindle, feeding means therefor, driving means for rotating the main spindle, a head to be fed with the spindle, a pair of tool carrying rotary holders in said head driven from the main spindle, means relatively shiftable in said head for adjusting the spacing parallel to the spindle axis of the tool carrying holders as a unit to the head for thereby maintaining spaced relation between said holders, and driving transmission connections in said head from the spindle to said holders maintained axially parallel to said holders during their adjustment with said holders.

5. A machine tool embodying a base, a frame rising from the base and provided with an overhang, a pair of spindles depending from the overhang, a gear on each of said spindles, a non-rotary head carried by each spindle and providing a skirt, a plurality of gears in each of said heads, and means mounting said head carried gears in said skirt as a unit to be driven from the spindle gears, said mounting means being adjustable in said skirt radially of said spindle to vary the mesh relation of the pair of head carried gears with the spindle gears.

In witness whereof I affix my signature

GEO. E. HALLENBECK.